No. 871,506. PATENTED NOV. 19, 1907.
I. W. HODGSON.
RESILIENT TIRE.
APPLICATION FILED OCT. 12, 1906.
2 SHEETS—SHEET 1.
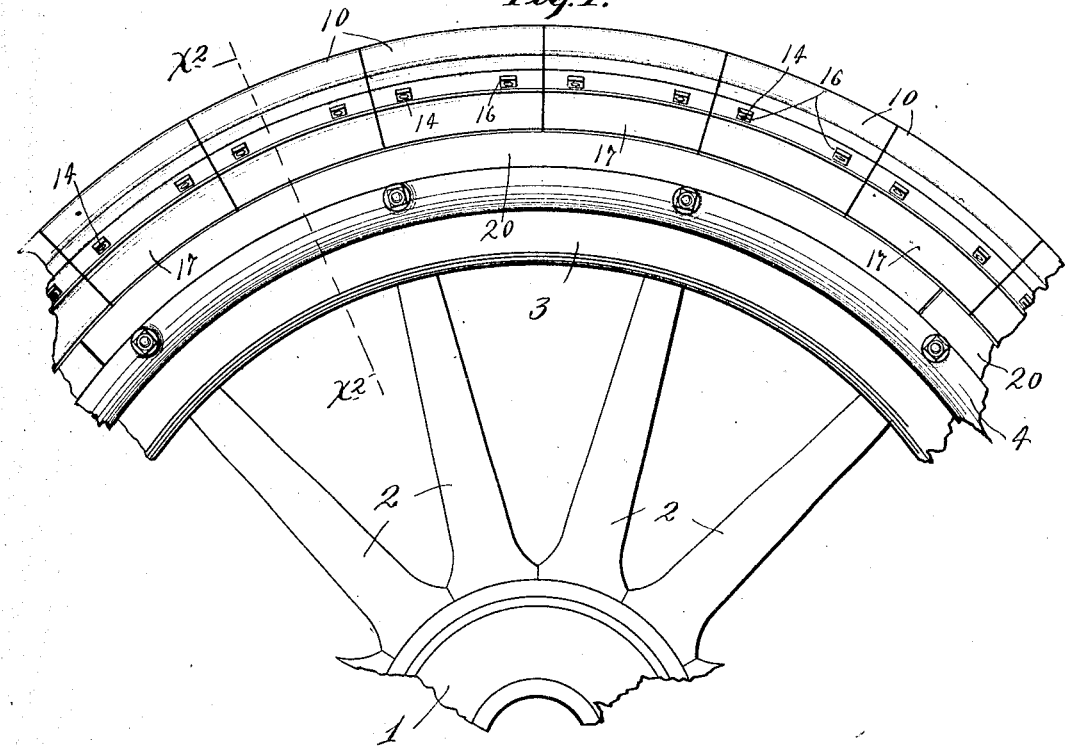
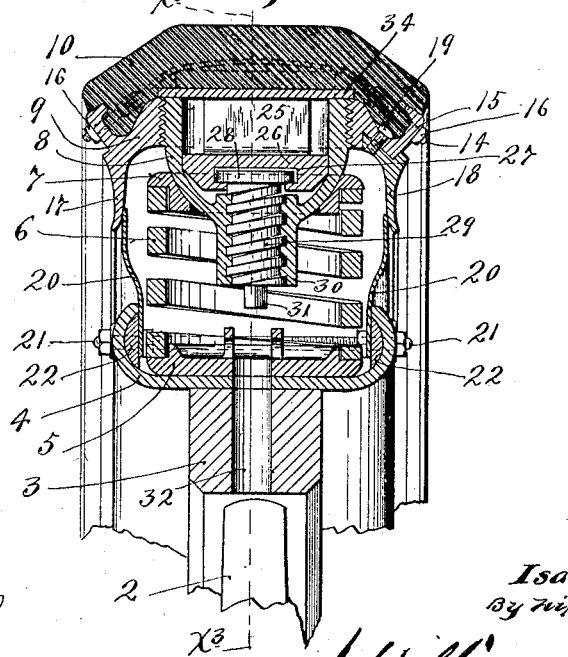

No. 871,506.
PATENTED NOV. 19, 1907.
I. W. HODGSON.
RESILIENT TIRE.
APPLICATION FILED OCT. 12, 1906.
2 SHEETS—SHEET 2.
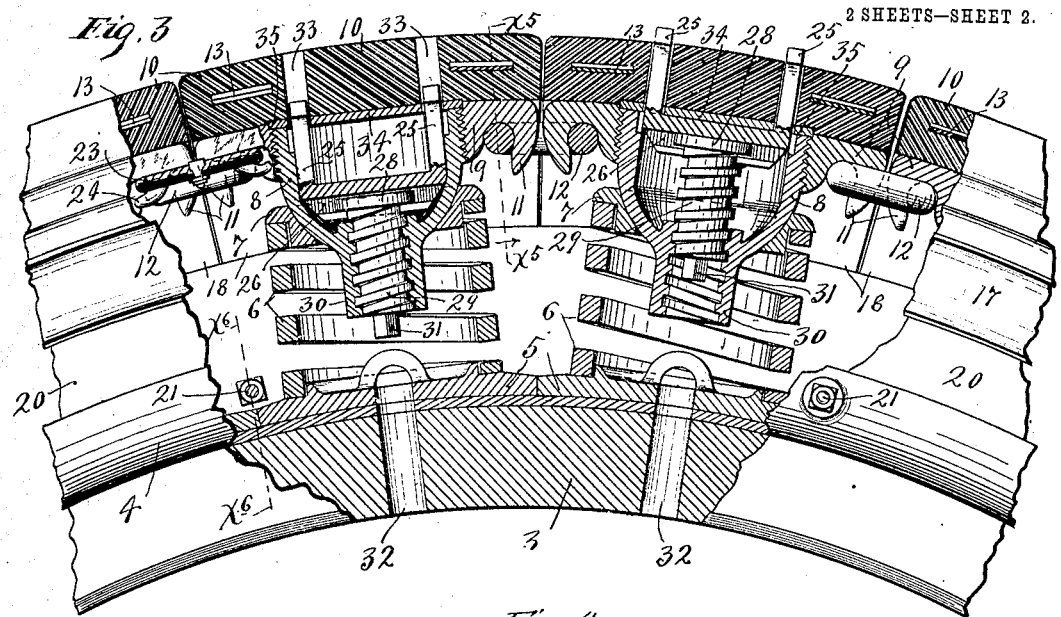
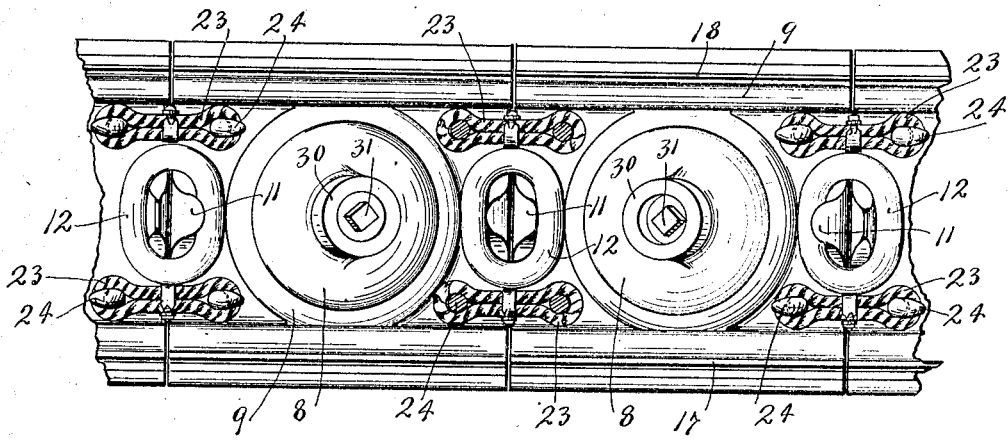
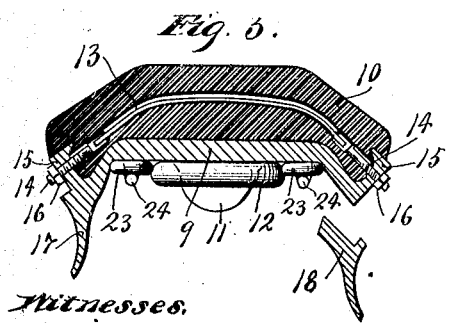
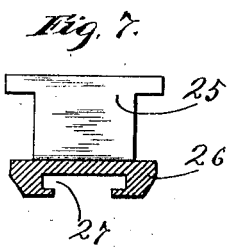
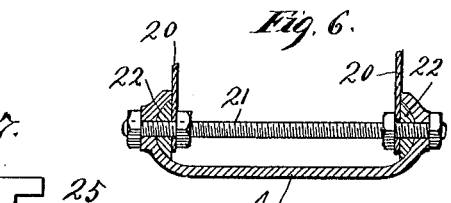
Witnesses.
Inventor
Isaac Walter Hodgson
By his Attorneys

UNITED STATES PATENT OFFICE.

ISAAC WALTER HODGSON, OF MINNEAPOLIS, MINNESOTA, ASSIGNOR OF ONE-HALF TO EDGAR J. HODGSON, OF MINNEAPOLIS, MINNESOTA, AND ONE-FOURTH TO PHILIP W. HERZOG, OF ST. PAUL, MINNESOTA.

RESILIENT TIRE.

No. 871,506.   Specification of Letters Patent.   Patented Nov. 19, 1907.

Application filed October 12, 1906. Serial No. 338,652.

*To all whom it may concern:*

Be it known that I, ISAAC WALTER HODGSON, a citizen of the United States, residing at Minneapolis, in the county of Hennepin and State of Minnesota, have invented certain new and useful Improvements in Resilient Tires; and I do hereby declare the following to be a full, clear, and exact description of the invention, such as will enable others skilled in the art to which it appertains to make and use the same.

My invention has for its object to provide a resilient wheel rim or tire which will have all of the good features of a pneumatic tire, but which relies for its resilience on springs and which may be maintained at much less cost than a pneumatic tire and which, generally, is free from the bad features of a pneumatic tire, such as damage by puncture, liability to explode and difficulty in repair.

To the above ends, the invention consists of the novel devices and combinations of devices hereinafter described and defined in the claims.

The invention is illustrated in the accompanying drawings, wherein like characters indicate like parts throughout the several views.

Referring to the drawings, Figure 1 is a view in side elevation, showing a portion of a wheel, such as an automobile wheel, having a resilient rim or tire embodying the several features of my invention. Fig. 2 is a vertical section taken on the line $x^2$ $x^2$ of Fig. 1, but showing the parts on a larger scale than in Fig. 1. Fig. 3 is a view partly in side elevation and partly in vertical section on the line $x^3$ $x^3$ of Fig. 2, showing a portion of the resilient rim. Fig. 4 is a bottom plan view looking at several of the yieldingly connected tread sections of the improved rim. Fig. 5 is a transverse section taken approximately on the line $x^5$ $x^5$ of Fig. 3. Fig. 6 is a transverse section taken on the line $x^6$ $x^6$ of Fig. 3, with some parts removed; and Fig. 7 is a detail partly in elevation and partly in transverse section, showing one of the so-called "calks" removed from working position.

Of the parts of the wheel, the numeral 1 indicates the hub, the numeral 2 the spokes and the numeral 3 the heavy wooden rim thereof. Surrounding and rigidly secured to the wheel rim 3, by means of screws, bolts or other suitable devices, (not shown) is a channel-shaped metal rim 4, the flanges of which project outward and laterally beyond the sides of said rim 3.

Seated in the channel of the metal rim 4 and forming preferably a continuous lining thereto, is a plurality of spring seats or bases 5 against which are seated radially extended circumferentially spaced coiled springs 6. The outer ends of the springs 6 bear against spring caps 7 that are formed with concave seats that closely fit the semi-spherical portions of hollow bearing members 8. The said members 7 and 8, as will hereinafter more clearly appear, constitute what correspond to the socket and ball members, respectively, of ball and socket bearing devices, so that the said members 8 are capable of universal rocking movements with respect to the said members 7.

Each bearing member or head 8 is seated in and has threaded engagement with a metallic part 9 of a tread member, preferably having secured thereto a thick outer facing 10 of rubber. These tread members might be constructed entirely of metal, or in part of metal or in part of rubber or similar material, are herein referred to broadly as tread sections, while the metallic members of the composite tread sections are referred to specifically as tread plates. The tread plates 9, at their end portions, are provided with heavy hook lugs 11, and the abutting hook lugs of the adjoining plates are connected by coupling links 12. The said tread sections are thus connected in an endless series and in such manner that they are capable of pivotal or rocking movements with respect to each other, both in the plane of the wheel and in planes transversely of the wheel. The rubber facings 10 are detachably but firmly secured to the corresponding tread plates 9, preferably by means of anchor straps 13 having threaded ends 14 that work through retaining lugs 15 on the sides of said tread plates, said threaded ends 14 being provided with nuts 16 outward of the said lugs 15, as best shown in Figs. 3 and 5.

At one side, the tread plates 9 are shown as provided with inwardly projecting, integrally formed guard flanges 17, and at the other sides with detachably secured guard flanges 18, preferably secured thereto by screws 19 (see Figs. 2 and 5).

Annular guard plates 20 of thin sheet metal are secured to the flanges of the metallic rim 4, preferably by means of nutted bolts 21, spacing blocks 22 being interposed between the said parts, as best shown in Fig. 2. The annular guard plates 20 are preferably made in sections, as shown in Fig. 1. Their outer edges engage frictionally with the inner surfaces of the guard flanges 17 and 18 and together therewith tightly inclose the springs and other portions of the tire.

As already stated, the links 12 permit the tread sections to move laterally at an angle with respect to each other. For limiting such angular movements I have shown supplemental or stop links 23, preferably constructed of a wire cable, the same being located one on each side of the several coupling links 12 and being engaged with hooks 24 on the tread plates 9, as best shown in Figs. 3 and 4.

In running over snow or over muddy roads, increased traction is desirable, and to this end I provide the tread sections with adjustable calks that are adapted to be moved from inoperative to operative positions, and vice versa, through the tread sections. These calks are preferably arranged in pairs, the prongs or plates 25 being integrally formed or rigidly connected to the base plate 26 that fits within the corresponding hollow head or bearing member 8. The base plate 26 is formed with a rectangular or dovetail channel 27, in which is swiveled the enlarged head 28 of an adjusting screw 29. The adjusting screw 29 works with threaded engagement in an inwardly projecting sleeve 30 of the corresponding head or bearing member 8. At its inner end, the adjusting screw 29 has a small angular shank 31 that alines with a radial passage 32 cut through the rims 3 and 4 and base plate or spring base 5. The calks 25 work or are adapted to be adjusted through passages 33 formed in the members 9 and 10 of the tread sections and in metal bearing plates 34 that are seated against the ends of the corresponding caps or bearing members 8. By means of a suitable tool inserted through one of the passages 32 and engaged with the alined shank 31, the adjusting screw 29 may be rotated so as to move the calk 25 inward or outward as desired. The said screws will, of course, hold the respective calks in any position in which they may be set.

The tension of the springs 6 may be varied by adjustments of the caps or bearing members 8 in the respective tread plates 9. To afford means for effecting such adjustments of the heads 8 when the tread members 9 and plates 34 are removed, the said heads are provided with internal notches 35 with which a suitable tool may be engaged.

A tire or resilient rim constructed as above described is not only strong and durable and, hence, maintainable at small cost, but has the desired resilience necessary to relieve the machine from the usual jars incident to rough roads and has sufficient lateral flexibility to relieve the wheels from intense strains when an obstruction such as a rock or track rail, for example, are struck a glancing blow, or at an angle. Furthermore, the component parts of the tire are capable of being easily repaired in case of accident.

What I claim is:

1. A resilient tire comprising an inner rim, a plurality of tread sections, links arranged in a plane approximately parallel to the plane of the connected tread sections and yieldingly connecting the tread sections in an endless series around said rim with freedom for movements in the plane of the wheel and transversely thereof, and a multiplicity of coiled springs compressed between the said rim and tread sections and exerting outward pressure thereon, substantially as described.

2. In a resilient tire, the combination with an inner rim, of a multiplicity of tread sections and interlocking devices yieldingly connecting the same, and a multiplicity of coiled springs compressed between the said rim and tread sections and exerting outward pressure thereon, under which outward pressure the said interlocking devices are held engaged, but which interlocking devices are capable of easy separation when relieved from spring pressure thereon, substantially as described.

3. In a resilient tire, the combination with an inner rim, of a plurality of yieldingly connected tread sections, ball and socket devices applied to said tread sections, and coiled springs compressed between said rim and one member of each ball and socket device, whereby the said tread sections are mounted for universal rocking movement, substantially as described.

4. In a resilient tire, the combination with a rim, of a plurality of yieldingly connected individual tread sections having inturned flanges at the sides of the tire, springs interposed between said rim and said tread sections, and laterally yielding annular guard plates secured to the sides of said rim and frictionally engaging with the flanges of said tread sections, substantially as described.

5. In a resilient tire, the combination with an inner rim, of a plurality of individual tread sections and links flexibly connecting the same, springs compressed between said rim and said tread sections, individual pliable facings applied to the outer faces of said tread sections, and anchor straps passed through said facings and secured to the respective tread sections, substantially as described.

6. In a resilient tire, the combination with an inner rim, of a plurality of individual tread sections, links yieldingly connecting said tread sections in an endless series around said rim, and laterally spaced supplemental stop links connecting the said tread sections on opposite sides of said links, and coiled springs compressed between said rim and the said tread sections, substantially as described.

In testimony whereof I affix my signature in presence of two witnesses.

ISAAC WALTER HODGSON.

Witnesses:
  MALIE HOEL,
  F. D. MERCHANT.